United States Patent [19]
Lagoni

[11] Patent Number: 5,339,115
[45] Date of Patent: Aug. 16, 1994

[54] VARIABLE BANDWIDTH LUMINANCE FILTER WITH COMMONLY TUNED DELAY AND AMPLITUDE CONTROLLING FILTERS PROVIDING FREQUENCY INDEPENDENT AND BANDWIDTH INDEPENDENT DELAY CHARACTERISTIC

[75] Inventor: William A. Lagoni, Indianapolis, Ind.

[73] Assignee: Thomson Consumer Electronics, Inc., Indianapolis, Ind.

[21] Appl. No.: 946,281

[22] Filed: Sep. 16, 1992

[51] Int. Cl.⁵ ............................................. H04N 9/64
[52] U.S. Cl. ................................................... 348/711
[58] Field of Search ................... 358/36, 167, 38, 22, 358/21, 31, 39, 904; 333/28 R; 348/711, 554, 618, 571, 578; H04N 5/46, 9/64

[56] References Cited
U.S. PATENT DOCUMENTS

| | | | |
|---|---|---|---|
| 3,924,266 | 12/1975 | Harwood | 358/38 |
| 3,969,762 | 7/1976 | Favreau | 358/38 |
| 4,472,733 | 9/1984 | Bolger | 358/38 |
| 5,032,900 | 7/1991 | Sendelweck | 358/21 |
| 5,107,341 | 4/1992 | Sendelweck et al. | 358/22 |

FOREIGN PATENT DOCUMENTS

| | | | |
|---|---|---|---|
| 394001 | 10/1990 | European Pat. Off. | H04N 9/64 |
| 455131 | 11/1991 | European Pat. Off. | H04N 5/44 |
| 455138 | 11/1991 | European Pat. Off. | H04N 9/64 |

OTHER PUBLICATIONS

European Search Report dated Dec. 6, 1993 for EP 93114206.1.

*Primary Examiner*—Mark R. Powell
*Assistant Examiner*—John W. Miller
*Attorney, Agent, or Firm*—Joseph S. Tripoli; Peter M. Emanuel; Richard G. Coalter

[57] ABSTRACT

A luminance signal filter for use in a multi-source television receiver, includes a tunable filter responsive to a bandwidth control input signal for determining the bandwidth of luminance signals applied to said filter and a variable delay circuit inversely responsive to said bandwidth control input signal for providing a substantially uniform overall delay for said luminance signal filter.

10 Claims, 9 Drawing Sheets

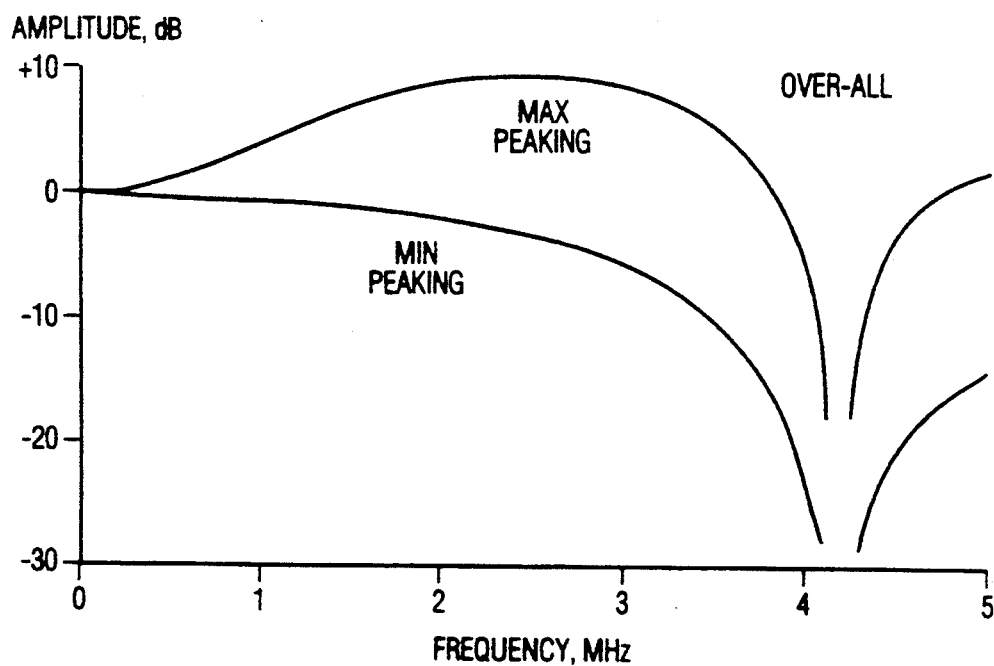
FIG. 9A
FIG. 9B
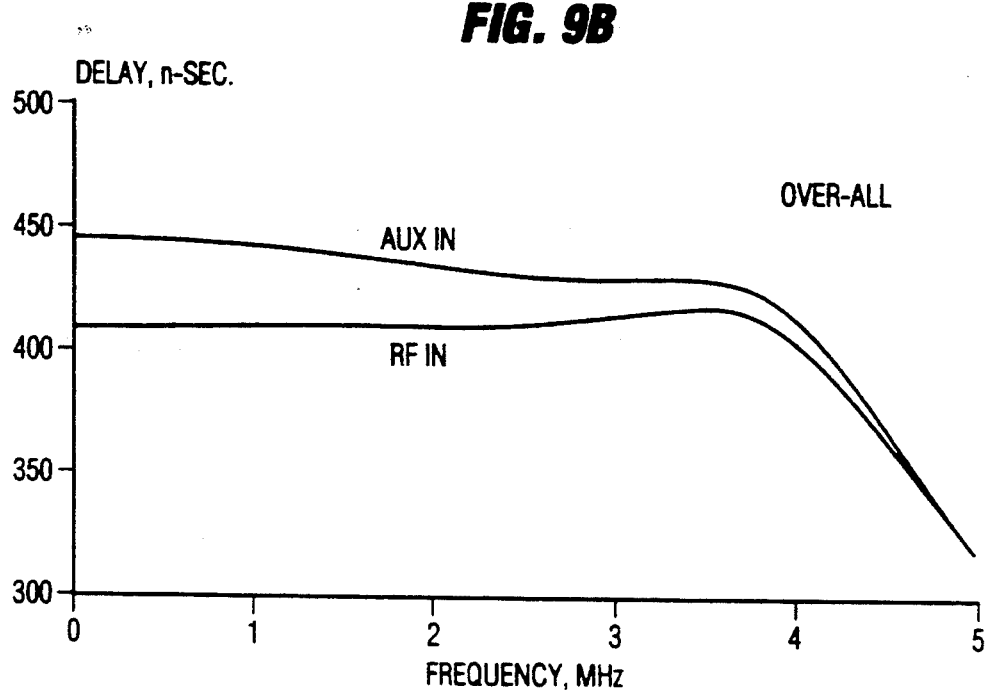

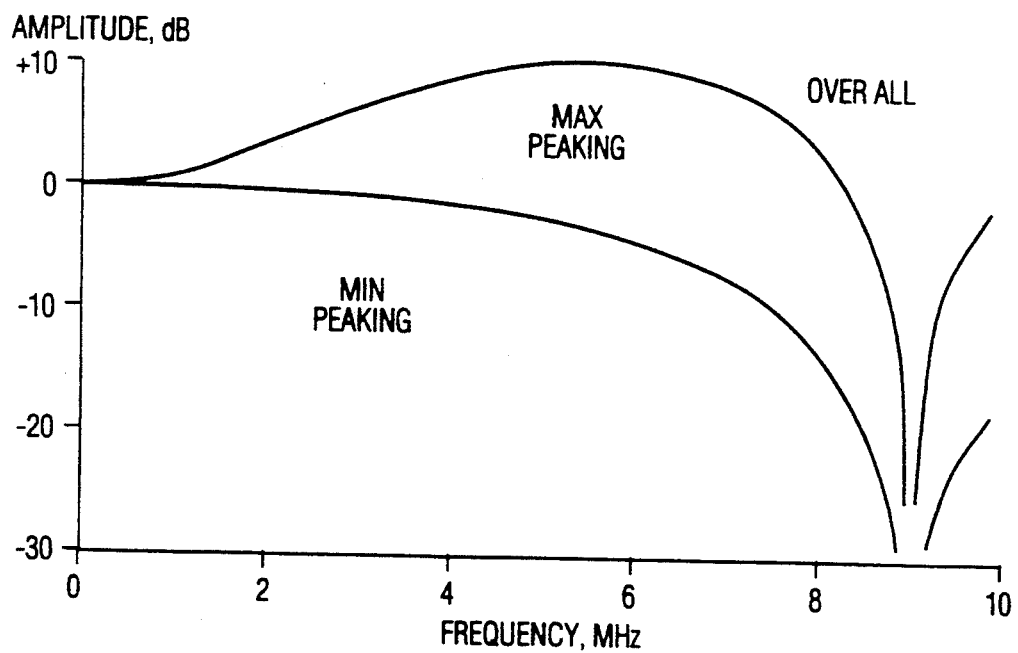
FIG. 10A
FIG. 10B
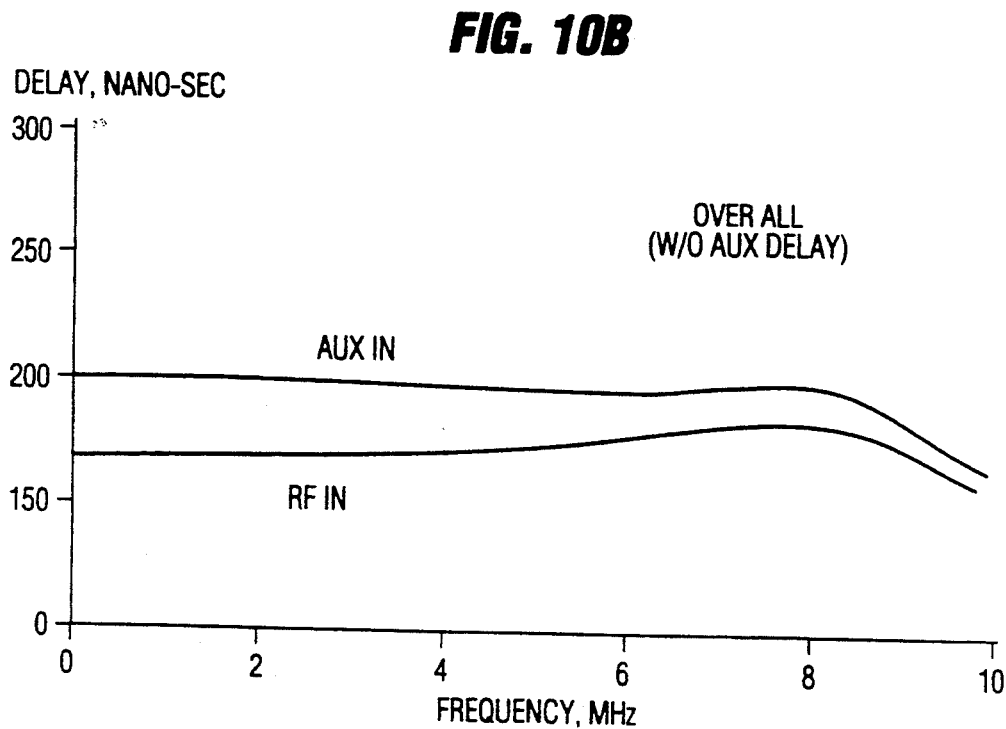

VARIABLE BANDWIDTH LUMINANCE FILTER WITH COMMONLY TUNED DELAY AND AMPLITUDE CONTROLLING FILTERS PROVIDING FREQUENCY INDEPENDENT AND BANDWIDTH INDEPENDENT DELAY CHARACTERISTIC

FIELD OF THE INVENTION

This invention relates to television receivers generally and particularly to receivers having plural video inputs for video sources.

BACKGROUND OF THE INVENTION

Television receivers having plural video inputs are well known. See, for example, U.S. Pat. No. 5,032,900 of Sendelweck entitled TELEVISION RECEIVER WITH AUXILIARY INPUT CONNECTOR FOR VIDEO SIGNALS OF A SEPARATED Y-C FORMAT which issued Jun. 16, 1991. The Sendelweck receiver includes inputs for a conventional RF video source (antenna), two inputs for auxiliary baseband composite video sources and a fourth input for video signals of a separated Y-C format commonly called "SVHS".

Receivers having multiple inputs generally provide some form of chrominance signal sideband equalization to account for the differences in chroma sidebands between tuner provided chroma signals and auxiliary or SVHS provided chroma signals. Specifically, for RF sources the chroma upper sideband is attenuated more than the lower sideband due to the IF filter response whereas for auxiliary signal sources the chrominance signal sidebands are generally of equal (symmetrical) amplitude. This may be corrected, as described in U.S. Pat. No. 5,107,341 of Sendelweck et al. entitled COLOR TELEVISION APPARATUS WITH PICTURE-IN-PICTURE PROCESSING AND WITH VARIABLE CHROMINANCE SIGNAL FILTERING which issued Apr. 21, 1992. The variable filtering there described subjects the main picture being displayed to asymmetrical chroma filtering where the source is the television signal tuner and subjects the main picture being displayed to symmetrical filtering where the source is an auxiliary video input signal.

SUMMARY OF THE INVENTION

The present invention resides in part in recognizing the need for a luminance filter for filtering the luminance signal selected for display as a function of the bandwidth of the video signal source. A need further exists for a luminance filter providing corrections for different chrominance signal delays when switching between symmetrical and asymmetrical chroma correction filters. A need further exists for a luminance filter exhibiting substantially constant group delay within a band of frequencies but which may be varied as a function of the video signal source bandwidth for ensuring proper luma-chroma registration and minimal luminance signal distortion. A need further exists for selectable luminance signal bandwidths for different receivers which may incorporate different types of luminance/chrominance signals separators (e.g., comb filter, low-pass/high-pass filters, low-pass broadband subtraction filters, high pass/broadband subtraction filters, etc.).

The present invention is directed to meeting various ones and combinations of the foregoing needs.

A luminance signal filter for use in a multi-source television receiver, in accordance with the invention, comprises a tunable filter responsive to a bandwidth control input signal for determining the bandwidth of luminance signals applied to said filter; and a variable delay circuit inversely responsive to said bandwidth control input signal for providing a substantially uniform overall delay for said luminance signal filter.

BRIEF DESCRIPTION OF THE DRAWING

The foregoing and further features of the invention are shown in the accompanying drawing wherein like elements are denoted by like reference designators and in which:

FIG. 9A illustrates the overall amplitude response of the filter of FIG. 2 for different values of peaking and a 4.2 MHz bandwidth;

FIG. 9B illustrates the overall delay response of the filter of FIG. 2 for auxiliary and RF sources and a selected bandwidth of 4.2 MHz;

FIG. 10A illustrates the overall amplitude response of the filter of FIG. 2 for different values of peaking and a 9 MHz selected bandwidth; and FIG. 10B illustrates the overall delay response for the filter of FIG. 2 for auxiliary and RF inputs for a selected bandwidth of 9 MHz and for the case where the auxiliary output delay filter is switched off.

DETAILED DESCRIPTION

Figure 1:
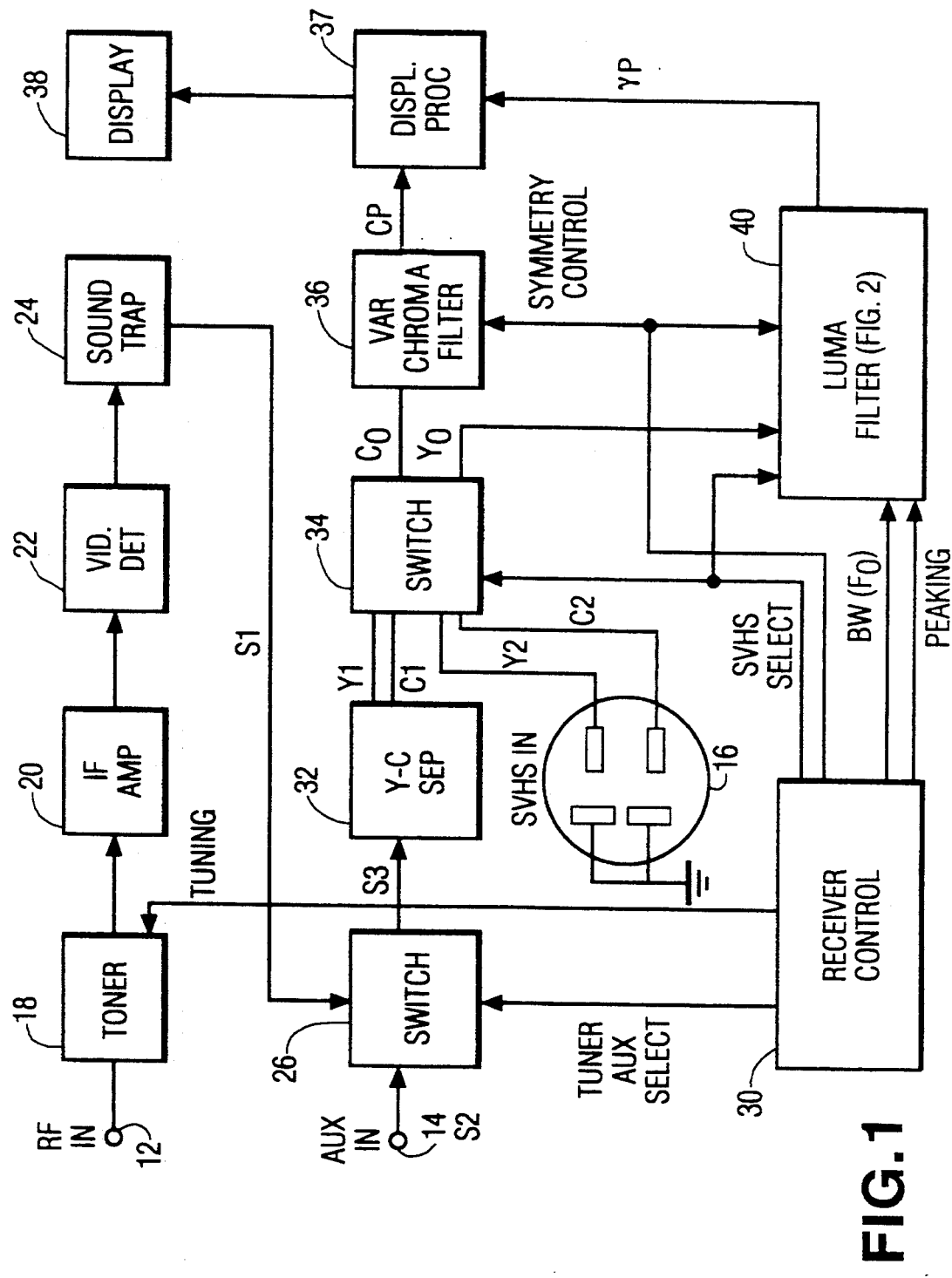
FIG. 1 is a block diagram of a television receiver embodying the invention.

The receiver 10 of FIG. 1 has an RF input 12, an auxiliary input 14 and an SVHS input 16. The RF input is applied to a tuner 18, and IF amplifier 20, a video detector 22 and a sound trap 24 to produce a baseband composite video signal S1. A switch 26, controlled by a receiver control unit 30, selects the tuner provided baseband signal S1 or the auxiliary video input signal S2 in accordance with a viewers choice. The control unit also provides a tuning voltage to the tuner for selecting channels. The selected baseband video signal S3 is applied to a luminance/chrominance signal separator 32 that separates signal S3 into a luminance component Y1 and a chrominance component C1. The signal separator 32 may be of the conventional comb filter type or some other suitable type (e.g., low-pass/high pass; a low-pass with subtraction from a broadband input; a high pass with subtraction from a broadband input, etc.) The receiver control unit (e.g., a microprocessor controlled by the receiver remote control) also controls a second switch 34 for selecting the baseband signal Y1 and C1 or the SVHS baseband luminance and chrominance signals Y2 and C2. The selected chrominance signal Co is applied to a variable symmetry chrominance filter 36 which also controlled by the receiver control unit 30. Specifically, when RF signals are received filter 36 provides an asymmetrical response for the chrominance signal to compensate for the reduction in amplitude of the upper color sideband due to the IF filter and sound trap response characteristics. For all other input sources (aux and SVHS) the control unit switches color filter 36 to provide a symmetrical response for the chrominance signal. The luminance output of switch 34 is processed by a luminance filter 40, as will be described and the processed luminance Yp and chrominance Cp signals are applied to a display processor 37 which provides conventional functions such as color demodulation, flesh tone correction, hue and saturation control, brightness control contrast control, matrixing, etc. and generates a processed video output signal in RGB form for display by a display device 38 (e.g., a kinescope or other suitable device).

In operation, the receiver control unit 30 controls channel selection and switches 26 and 34 for signal source selection as noted above. Also, for tuner video the control unit places chroma variable filter in the asymmetrical mode and for all other sources it places the chroma variable filter in the symmetrical mode thus correcting for sideband amplitude distortion. The luminance filter 40 receives the selected luminance signal Yo and applies variable bandwidth, variable delay and variable peaking to produce the processed output signal. These functions are controlled by the symmetry control signal, the SVHS select signal, a peaking control signal and a bandwidth control signal provided by the receiver control unit 30. The appreciate the nature of the various functions provided by luminance filter 40, a detailed block diagram is presented in FIG. 2.

Figure 2:
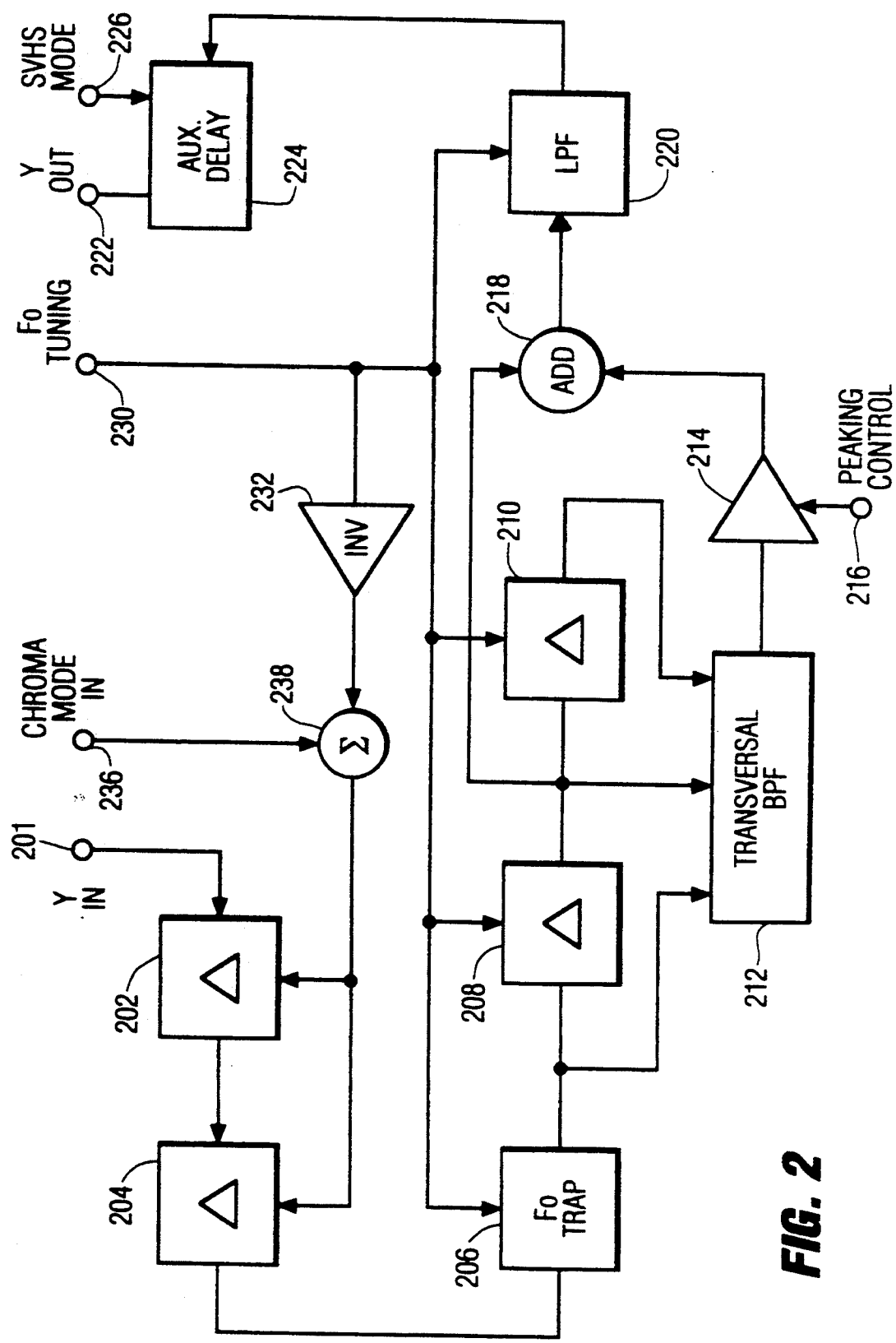
FIG. 2 is a detailed block diagram of a luminance filter employed in the receiver of FIG. 1.

The luminance filter of FIG. 2 is constructed mainly of a number of tunable active filters including the constant amplitude all pass type, the tunable low pass type and the tunable band reject (trap or notch) type. The selected luminance input signal Yo at input 201 is coupled via a cascade to two all pass filters 202, 204 which provide variable delay to a tunable trap (Fo TRAP) 206 that is tunable to the desired luma bandwidth (e.g., 3.6, 4.2 or 9 MHz) depending on the signal source selected. A cascade of two more all pass (delay) filters 208 and 210 further delay the signal to provide inputs to a transversal band pass filter 212 which combines the signals to provide a peaking signal. A variable gain amplifier 214 varies the amplitude of the peaking signal in accordance with the control signal supplied by the receiver control unit to input 216. An adder 218 combines the variable peaking signal with the output of delay unit 208 to provide a sum signal that is low pass filtered by tunable low pass filter 220. The processed luminance signal is supplied to output terminal 222 via an auxiliary fixed delay unit 224 which is selected by SVHS mode signal applied to input 226 when the user selects the SVHS operating mode. Otherwise, the auxiliary delay 224 is by-passed for the other receiver bandwidths (e.g., tuner or auxiliary inputs selected). Control of the tunable portions of the filter is provided by a tuning voltage (Fo) provided by control unit 30 to input 230. This directly controls the tuning of Fo trap 206 which sets the filter band edge, low pass filter 220 and the two delays 208 and 210 which are part of the transversal peaking filter. The delays 204 and 202 vary inversely with the tuning voltage by means of inverter 232 which inverts the Fo tuning signal. As will be explained, this is to correct the overall delay response of the filter for different bandwidths. A further delay correction is provided by adder 238 which receives the chroma filter mode control signal at terminal 236 and adds it to the inverted Fo tuning voltage.

Figure 3:
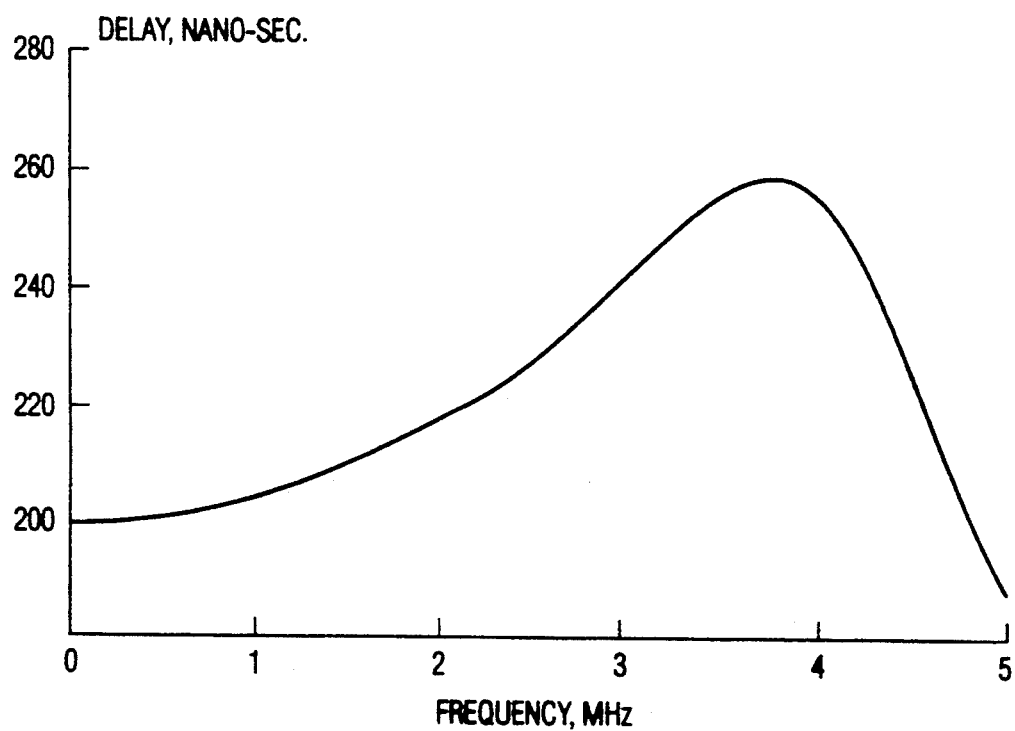
FIG. 3 is a diagram illustrating the group delay of a portion of the filter of FIG. 2.
Figure 4:
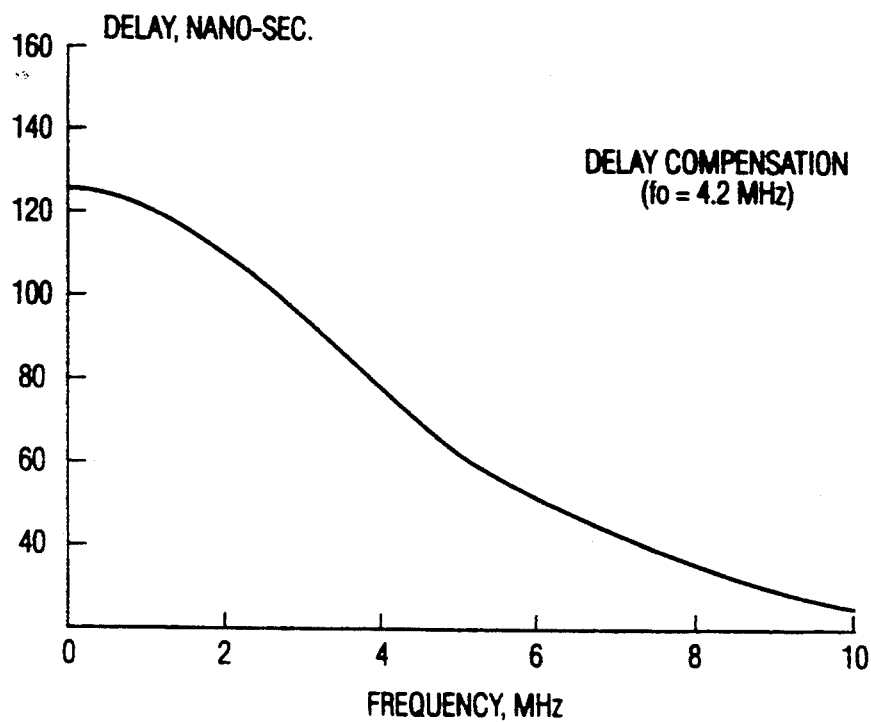
FIG. 4 is a diagram illustrating the group delay of a variable delay compensation filter used in the luminance filter of FIG. 2.

In operation, the luminance filter 40 provides selectable luma bandwidths to accommodate comb filter and non-comb filter composite video modes as well as a wide bandwidth component input (SVHS) mode. The three modes are accomplished having luma-chroma temporal matching along with two selectable chroma band pass filter modes for either symmetric or asymmetric (chroma peaker) responses. The amplitude shape of the luma response is the same for each of the three modes with only a frequency axis scaling. All filters are of the operational transconductance amplifier active filter type in a configuration having variable frequency/constant Q vs. tuning voltage. The luminance response is a very close approximation to the objective of a "cosine minus third harmonic" response and is determined by the cascade of elements 206 to 220. The delay response of these elements is shown in FIG. 3 which shows (for the 4.2 MHz case) a generally increasing delay with frequency. FIG. 4 shows the response of the delay correction filters 202 and 204 which, as seen, has a generally decreasing delay with frequency. The net delay of the combination is substantially constant and this desirable feature is maintained for the different bandwidths. For the wideband case (9 MHz) the delay is also constant but additional (constant) delay is added by unit 224 so as to match the chroma signal delay.

In more detail, The Fo trap 206 is tuned to the band edge frequency Fo (e.g., 3.6 MHz or 4.2 MHz or 9 MHz) and has a Q of 1.5. The transversal band pass filter (which includes the two all pass delay elements 208, 210), is tuned to 1.15 time Fo (by virtue of the delay of the all pass filters which have resonant frequency of 1.15 times Fo). The low pass filter is provided with a high side trap where the resonant frequency of the low pass filter is Fo and the trap is 3.17 times Fo. The Q of the low pass filter is 0.6.

Since each of these frequency determining elements is related multiplicatively to Fo and Fo is determined by the tuning control voltage applied to each filter, the filters will track in such a manner as to accomplish the desired filter shape common to all modes with only a frequency axis scaling.

As the frequency axis is scaled, there is a change in luma delay as would be expected (wider bandwidth filters of a given order, have less delay than lower bandwidth filters of the same order). Given that the chroma bandwidth does not change with Fo, the filter includes provisions for temporal matching. The temporal matching provision comprises delay units 202 and 204 which accommodates the changes in chroma delay associated with switching the chroma bandpass filter between the symmetric and asymmetric modes as well as the case of changing the luma bandwidth.

Given that the filter blocks in FIG. 2 are each second order responses, the group delay characteristics are not flat over the range DC to Fo. The group delay of the filters 206–220 for the Fo=4.2 MHz auxiliary input mode are shown in FIG. 3. This leads to the need for group delay equalization of the amplitude response determining blocks. This delay must also track with the frequency axis scaling discussed above. By using the Fo trap as a primary amplitude response determinant, with its significant group delay rise up to Fo, two all-pass stages (202, 204) with a moderately low Q can be used both for luma-chroma temporal matching and for the required delay equalization. By controlling the tuning voltage of these all-pass filters inversely with the Fo tuning voltage, the group delay shape will remain essentially constant (just as the amplitude responses of the filters) with only a frequency axis scaling and a scaling of the delay axis. In this way the total amplitude and group delay responses and the luma-chroma temporal match will be essentially constant and flat for various modes with only the desired frequency axis scaling. Changes in the luma delay to accommodate chroma band pass filtering mode switching is accomplished by additional tuning control offsets to the luma allpass delay elements 202 and 204 (e.g., adder 338 adds the chroma mode signal to the Fo (inverted) tuning signal).

Figure 5A:
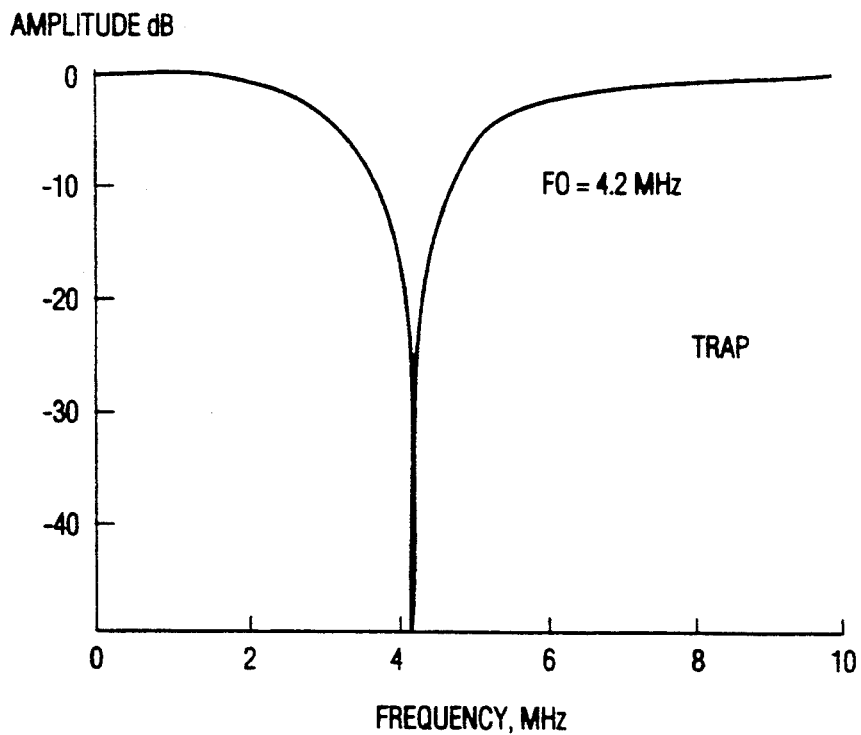
FIG. 5A is a diagram illustrating the amplitude response of a band-edge trap filter in the luminance filter of FIG. 2.
Figure 5B:
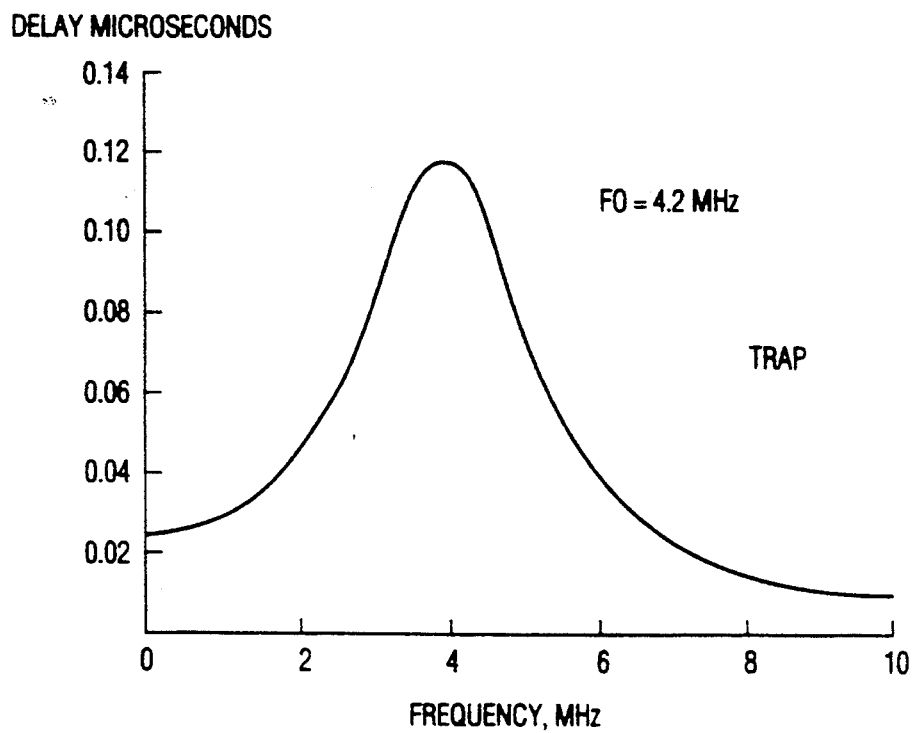
FIG. 5B is a diagram illustrating the delay response of the trap filter of FIG. 5A.
Figure 6A:
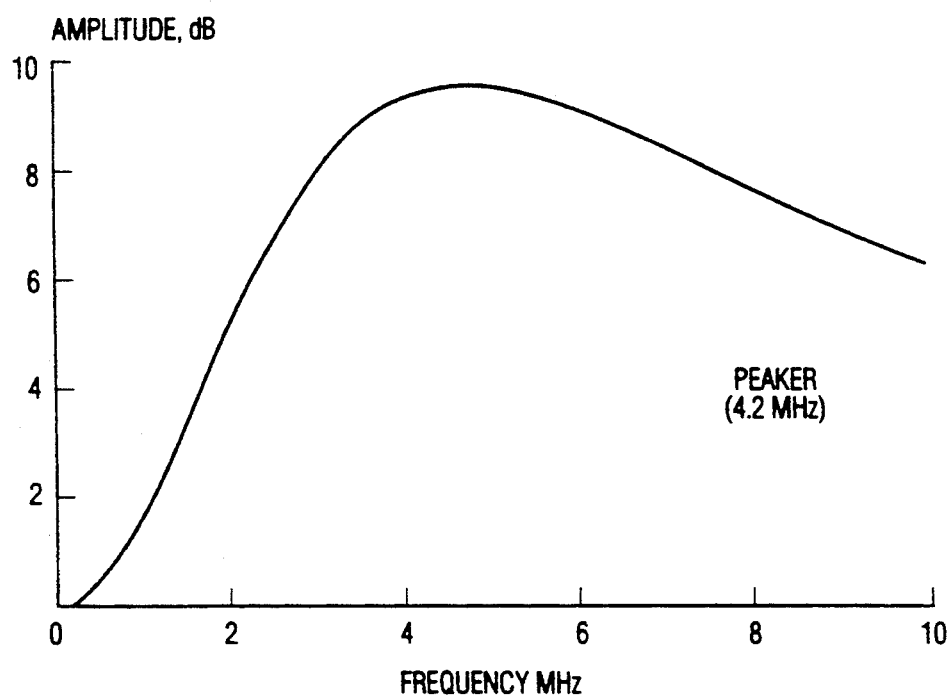
FIG. 6A is an amplitude diagram illustrating the response of a transversal peaker used in the luminance filter of FIG. 2.
Figure 6B:
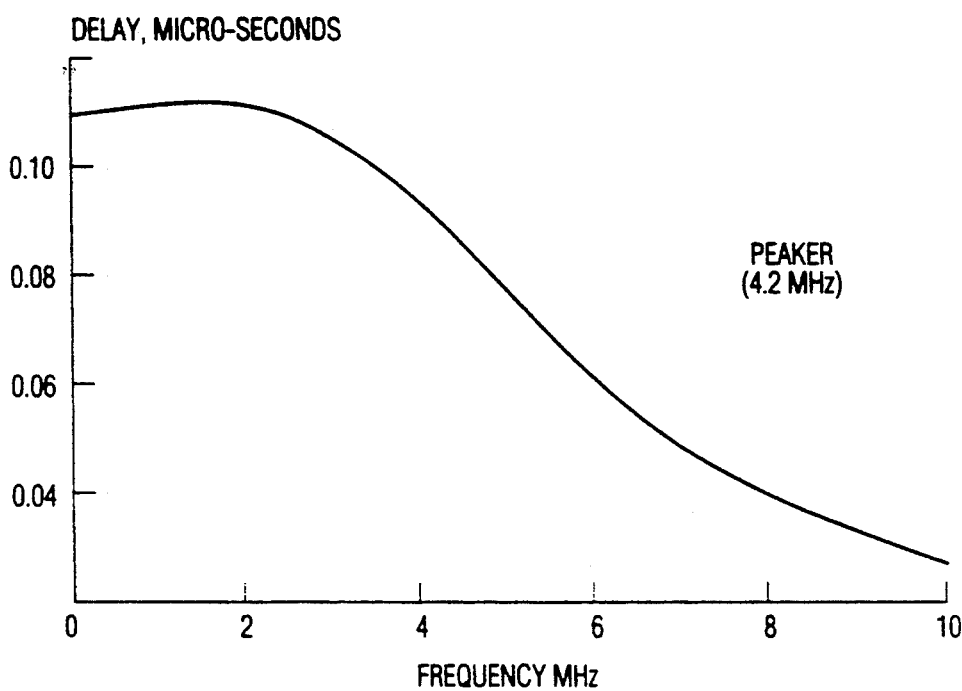
FIG. 6B is a diagram illustrating the group delay response of the transversal peaker of FIG. 6A.
Figure 7A:
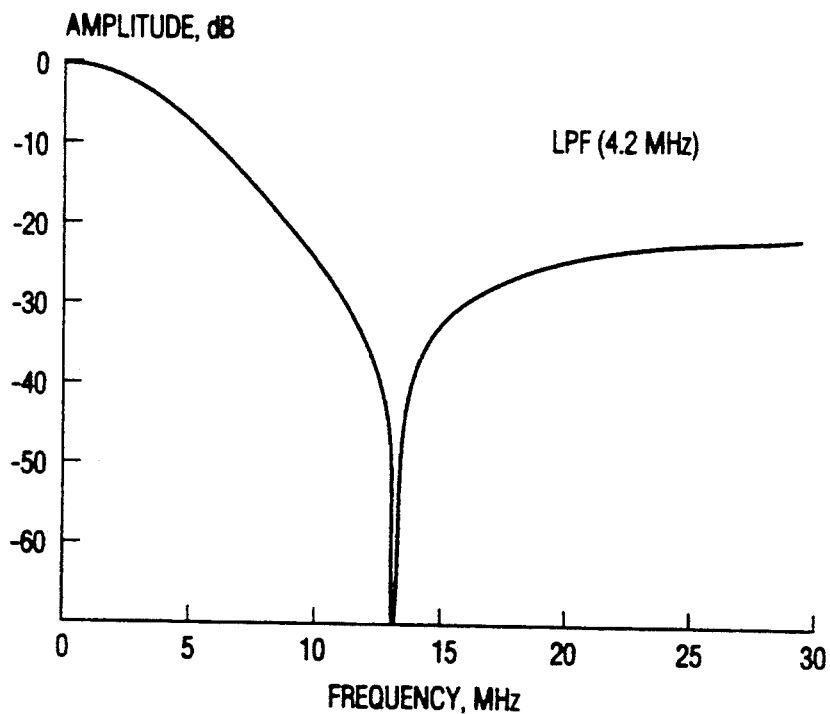
FIG. 7A illustrates the amplitude response of a low pass filter used in the luminance filter of FIG. 2.
Figure 7B:
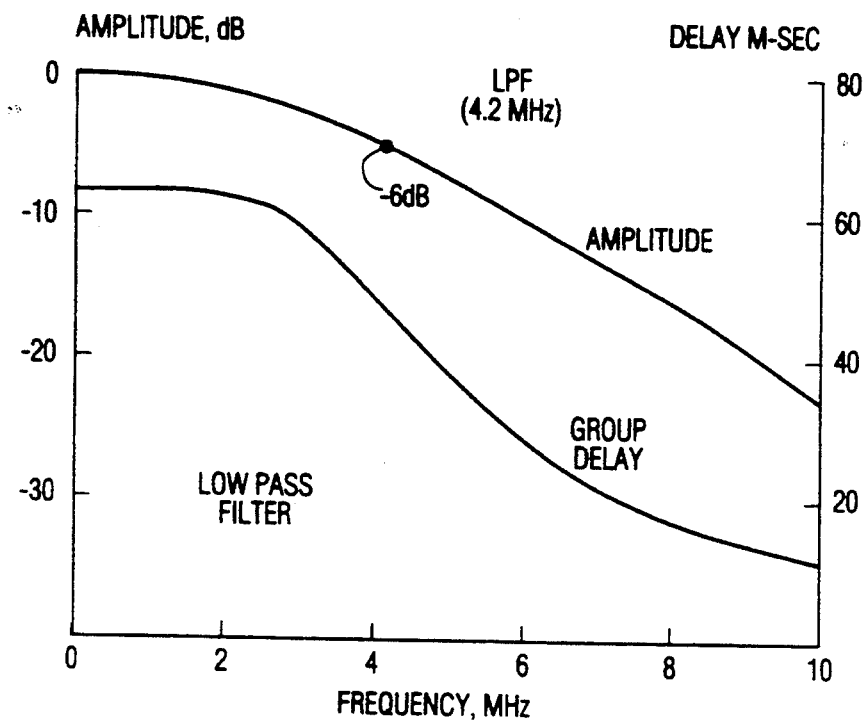
FIG. 7B illustrates the amplitude response and group delay of the low pass filter of FIG. 2 drawn on an expanded scale.
Figure 8A:
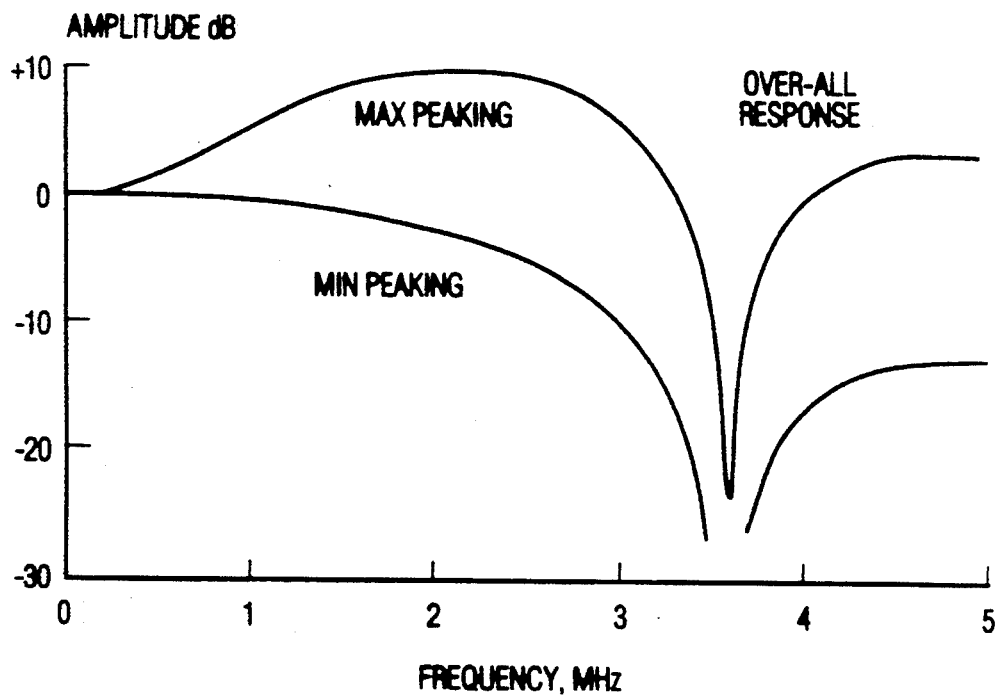
FIG. 8A illustrates the overall amplitude response of the FILTER of FIG. 2 for different values of peaking and a 3.6 MHz selected bandwidth.
Figure 8B:
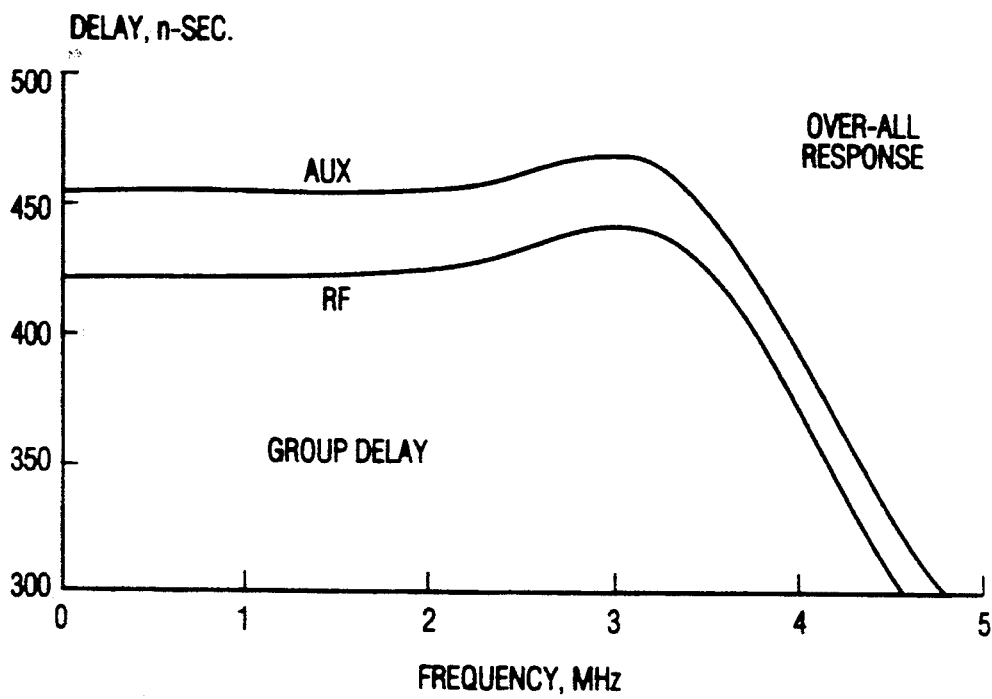
FIG. 8B, compares the overall delay response of the filter of FIG. 2 for auxiliary and RF input signal sources and a 3.6 MHz bandwidth.

FIG. 4 shows the group delay response of the delays 202 and 204 for the Fo=4.2 MHz auxiliary video input case while FIGS. 5–7 show the amplitude and group delay characteristics of the Fo trap, transversal peaker and low pass filter for the same Fo=4.2 MHz case. The overall luma responses for the Fo=3.6 MHz, 4.2 MHz and 9 MHz; RF input and auxiliary input cases are shown in FIGS. 8 through 10. It will be noted that the temporal luma chroma match is not maintained in the Fo=9 MHz case for the tunable filter elements. This is corrected by the auxiliary delay unit 224 which is switched in for the 9 MHz mode and is by-passed otherwise.

Various changes and modifications may be made to the embodiment of the invention herein before described. For example, although the invention has been illustrated using analog technology (active filters), the same result may be achieved using digital technology. Also, although specific frequencies have been used, illustratively, for the NTSC television system standards, the principles apply equally as well to other television system standards such as PAL and SECAM. Furthermore, the order of cascaded sections may be reversed or interchanged as long as the overall processing of the luminance signal is substantially the same. Other such changes will be readily apparent to one of ordinary skill in the art.

There has been shown and described, a luminance signal filter for use in a multi-source television receiver, which provides variable luminance signal bandwidths with substantially uniform delay and with corrections for chrominance signal bandwidth changes depending on the signal source selected.

What is claimed is:

1. A luminance signal filter for use in a television receiver, having plural luminance signal sources of differing bandwidths comprising:
    switch means coupled to said sources for providing a selected luminance signal for display;
    control means for (i) controlling the selection of said video input signals and for (ii) providing a bandwidth control signal indicative of the nominal bandwidth of said selected luminance signal;
    a tunable filter responsive to said bandwidth control signal for determining the bandwidth of said selected luminance signal applied to said display;
    said tunable filter having a delay which varies as a function of the frequency of components within the filter passband and which also varies with changes in said bandwidth of said selected luminance signal; and
    a variable delay circuit coupled in series with said tunable filter and responsive to said bandwidth control input signal for providing delay equalization for said signal frequencies within said passband of said tunable filter and for concurrently providing a substantially constant overall delay for said luminance signal for said differing bandwidths.

2. A filter as recited in claim 1 further comprising:
    an output in said control means for providing a further bandwidth control signal indicative that said selected luminance signal is provided by a wideband video signal source;
    an auxiliary delay circuit coupled in series with said tunable filter and said variable delay circuit for imparting an additional predetermined delay to said selected luminance signal in response to the presence of said further bandwidth control signal.

3. A filter as recited in claim 1 wherein:
    said tunable filter comprises a series connection of a tunable low pass filter and a tunable notch filter, both having tuning inputs coupled to receive said bandwidth control signal; and
    said variable delay circuit comprises a tunable all-pass filter having a tuning input coupled to the tuning inputs of said tunable low pass filter and said tunable notch filter.

4. A filter as recited in claim 1 further comprising:
    an output in said control means for providing a color processing mode indicating signal having a first state indicating that a color signal processed by said receiver is subjected to symmetrical filtering and having a second state indicating that said color signal is subjected to asymmetrical filtering; and
    means for combining said color processing mode indicating signal with said bandwidth control signal for application to a tuning input of said variable delay circuit.

5. A filter as recited in claim 1 further comprising:
    a variable peaking circuit coupled in series with said tunable filter and said variable delay circuit;
    means for applying a peaking amplitude control signal to a first input of said peaking circuit for controlling the amplitude of a peaking component applied to said selected luminance signal; and
    means for applying said bandwidth control signal to a second input of said peaking circuit for controlling the frequency of said peaking component applied to said selected luminance signal.

6. A luminance signal filter for use in a television receiver having plural luminance signal sources of differing bandwidths comprising:
    switch means coupled to said sources for providing a selected luminance signal for display;
    control means for controlling the selection of said video input signals and for providing a bandwidth control signal indicative of the nominal bandwidth of said selected luminance signal;

a tunable filter responsive to said bandwidth control signal for determining the bandwidth of said selected luminance signal applied to said display;

said tunable filter having a delay which varies as a function of the frequency of components within the filter passband and which also varies with changes in said bandwidth of said selected luminance signal;

a variable delay circuit coupled in series with said tunable filter and responsive to said bandwidth control input signal for providing delay equalization for said signal frequencies within said passband of said tunable filter and for concurrently providing a substantially constant overall delay for said luminance signal for said differing bandwidths;

an output in said control means for providing a further bandwidth control signal indicative that said selected luminance signal is provided by a wideband video signal source;

an auxiliary delay circuit coupled in series with said tunable filter and said variable delay circuit for imparting an additional predetermined delay to said selected luminance signal in response to the presence of said further bandwidth control signal;

a variable peaking circuit coupled in series with said tunable filter and said variable delay circuit;

means for applying a peaking amplitude control signal to a first input of said peaking circuit for controlling the amplitude of a peaking component applied to said selected luminance signal; and means for applying said bandwidth control signal to a second input of said peaking circuit for controlling the frequency of said peaking component applied to said selected luminance signal.

7. A filter as recited in claim 6 wherein:

said tunable filter comprises a series connection of a tunable low pass filter and a tunable notch filter, both having tuning inputs coupled to receive said bandwidth control signal; and said variable delay circuit comprises a tunable all-pass filter having a tuning input coupled to the tuning inputs of said tunable low pass filter and said tunable notch filter.

8. A filter as recited in claim 7 further comprising:

an output in said control means for providing a color processing mode indicating signal having a first state indicating that a color signal processed by said receiver is subjected to symmetrical filtering and having a second state indicating that said color signal is subjected to asymmetrical filtering; and means for combining said color processing mode indicating signal with said bandwidth control signal for application to a tuning input of said variable delay circuit.

9. A luminance signal filter for use in a television receiver having plural luminance signal sources of differing bandwidths comprising:

switch means coupled to said sources for providing a selected luminance signal for display;

control means for controlling the selection of said video input signals and for providing a bandwidth control signal indicative of the nominal bandwidth of said selected luminance signal;

a tunable filter responsive to said bandwidth control signal for determining the bandwidth of said selected luminance signal applied to said display;

said tunable filter having a delay which varies as a function of the frequency of components within the filter passband and which also varies with changes in said bandwidth of said selected luminance signal;

a variable delay circuit coupled in series with said tunable filter and responsive to said bandwidth control input signal for providing delay equalization for said signal frequencies within said passband of said tunable filter and for concurrently providing a substantially constant overall delay for said luminance signal for said differing bandwidths; wherein said tunable filter comprises a series connection of a tunable low pass filter and a tunable notch filter, both having tuning inputs coupled to receive said bandwidth control signal;

said variable delay circuit comprises a tunable all-pass filter having a tuning input coupled to the tuning inputs of said tunable low pass filter and said tunable notch filter and further comprising:

an output in said control means for providing a color processing mode indicating signal having a first state indicating that a color signal processed by said receiver is subjected to symmetrical filtering and having a second state indicating that said color signal is subjected to asymmetrical filtering; and means for combining said color processing mode indicating signal with said bandwidth control signal for application to said tuning inputs of said variable delay circuit.

10. A filter as recited in claim 9 further comprising:

an output in said control means for providing a further bandwidth control signal indicative that said selected luminance signal is provided by a wideband video signal source; and an auxiliary delay circuit coupled in series with said tunable filter and said variable delay circuit for imparting an additional predetermined delay to said selected luminance signal in response to the presence of said further bandwidth control signal.

* * * * *